(12) United States Patent
Barnes et al.

(10) Patent No.: US 7,423,545 B1
(45) Date of Patent: Sep. 9, 2008

(54) FAILED FILTER ARREST INDICATOR AND METHOD FOR USE IN MULTIPLE ARRESTER LOCATION

(75) Inventors: Connie H. Barnes, Midland, VA (US); John K. Boland, II, Dover, DE (US); Hossein Eslambolchi, Los Altos Hills, CA (US); John Sinclair Huffman, Conyers, GA (US); Linard H. Miller, Leesburg, VA (US); Randall G. Scholz, Sterling, VA (US)

(73) Assignee: AT&T Corp., New York, NY (US)

( * ) Notice: Subject to any disclaimer, the term of this patent is extended or adjusted under 35 U.S.C. 154(b) by 274 days.

(21) Appl. No.: 11/287,743

(22) Filed: Nov. 28, 2005

Related U.S. Application Data

(63) Continuation of application No. 10/274,226, filed on Oct. 18, 2002, now Pat. No. 6,998,994.

(51) Int. Cl.
*G08B 21/00* (2006.01)

(52) U.S. Cl. .................. 340/660; 340/461; 340/522; 340/524; 340/551; 340/463; 324/66; 324/67; 324/527; 324/528; 324/531

(58) Field of Classification Search .................. 340/660, 340/461, 463, 522, 524, 551; 324/66, 67, 324/527, 528, 531
See application file for complete search history.

(56) References Cited

U.S. PATENT DOCUMENTS

| | | | | |
|---|---|---|---|---|
| 3,771,049 A | * | 11/1973 | Piccione | 340/664 |
| 4,143,251 A | * | 3/1979 | Clark | 324/67 |
| 6,100,699 A | * | 8/2000 | Eslambolchi et al. | 324/529 |

* cited by examiner

*Primary Examiner*—Tai T Nguyen

(57) ABSTRACT

The present invention is a technique for locating and identifying a failed filter/arrester in an underground conveyance such as a fiber optic cable. A sensor is installed in the filter/arrester housing to sense grounding of a cable locating frequency. The sensor will monitor the cable locating signal that is normally on the cable and blocked by the filter arrester to ground. A small radio frequency oscillator (85 to 88 Hz), also installed inside the filter housing, is activated by the sensor. The RF signal is detected above ground with standard cable locating equipment. A warning indicator such as an indicator light may also be installed on the outside of the filter housing. The indicator is also activated by the sensor. In that way, the particular failed filter can be identified if multiple filters are installed at that location. The power that will be required to operate the RF transmitter and indicator will be obtained from the voltage passing through the cable.

10 Claims, 2 Drawing Sheets

FAILED FILTER ARREST INDICATOR AND METHOD FOR USE IN MULTIPLE ARRESTER LOCATION

This application is a continuation and claims the benefit of U.S. application Ser. No. 10/274,226, filed on Oct. 18, 2002, now U.S. Pat. No. 6,998,994.

FIELD OF THE INVENTION

The present invention relates generally to a system of electromagnetic signaling to locate underground conveyances such as cabling, and more specifically to a method and apparatus for locating a failed surge arrester in such a system.

BACKGROUND OF THE INVENTION

Many utilities bury pipes and cables ("utility conveyances" or "conveyances") underground for reasons of both safety and aesthetics. Underground burial often provides protection to utility conveyances against weather and other sources of potential damage. Utilities that undertake burial of their conveyances usually make extensive efforts to plot the location of each buried conveyance on a map to facilitate its location in case of repair or replacement. While a map will indicate the general location of a buried conveyance, more precise location information often becomes necessary, particularly in urban environments. For that reason, most utilities that bury their conveyances underground rely on electromagnetic signaling techniques to precisely locate such conveyances.

U.S. Pat. No. 5,644,237, issued Jul. 1, 1997 and assigned to the same assignee as the present application, describes a principle for electromagnetic signaling for locating a buried utility conveyance. To locate a buried conveyance, a locating tone (signal) is applied to a metallic component of the conveyance. In the case of a fiber optic cable, the metallic component is typically a metallic sheath or a copper tracer wire within the cable. Using a signal detector of a type well known in the art, a technician detects the locating tone radiated above ground to precisely locate the conveyance.

Utility conveyances often share rights of way. For example, fiber optic cables may run parallel to high voltage power lines, or may cross high voltage lines. Those fiber optic cables may contain metallic components running along their length, as noted, to assist tracing the cable underground. In such situations, special precautions must be taken to avoid 60 Hz current in the metallic component induced by the power lines. Furthermore, optic cables with metallic components must be protected from ground currents produced by lightning strikes and from other high energy power surges that may occur in the field.

One means for minimizing the current on the cable and preventing lightning damage to the buried cable is the installation of filter/arresters at various locations along the cable route. The filter/arresters are typically installed at cable splice locations. Those filters direct 60 Hz current to ground but let the frequencies used for cable locating pass. The filters also act to send to ground any voltage surge that may enter the cable. That surge may be a lightning strike, failed phase on the parallel high voltage line, etc. More than one filter may be required at one location due to the extreme voltage that may be induced.

The filters may fail after a period of time. A typical failure mode causes the filters to permit all frequencies to pass to ground, including the frequency of the locating tone. When that happens, the cable locating tone is prevented from passing the point of the failed filter. Cable location from that point is impossible.

When a technician determines that there is a potential problem with an arrester/filter, the technician must currently travel to each splice location and must measure the cable locating current approximately one hundred feet on each side of the splice. If the technician detects a significant current drop, the technician excavates the splice and replaces the filter. If multiple filters have been installed at a single splice, then the technician must identify the particular filter that failed. That is often not possible due to the functionality of the tone oscillator. In those cases, all filters at that location are replaced.

It is therefore desirable to provide a method and system for readily locating a failed filter/arrester in an underground cable system having many filter/arresters along its length. A method and system is furthermore needed for identifying a failed filter/arrester at a splice location where there are multiple filter/arresters installed. Such a system would minimize the fault-finding process and associated travel time.

SUMMARY OF THE INVENTION

The present invention addresses those needs by providing a method and apparatus for locating and identifying a failed filter/arrester in an underground conveyance having multiple filter/arresters.

One embodiment of the invention is a method for locating a failed surge arrester in a buried underground conveyance having a conductive component running along its length and a conveyance locating current flowing through the conductive component. The method includes the step of sensing an RF signal from an oscillator activated by the conveyance locating current flowing through the failed surge arrester. The oscillator may be powered by the conveyance locating current.

In that method, the buried underground conveyance may have a plurality of surge arresters; in that case, the method may further include reading an external indicator activated by the conveyance locating current flowing through the failed surge arrester. The indicator distinguishes the failed surge arrester from other surge arresters of the underground conveyance. The indicator may be a light, and may be powered by the conveyance locating current.

In another embodiment of the invention, a method is provided for identifying a location of a failed surge arrester in a buried underground conveyance having a conductive part running along its length. The method includes the step of first applying a conveyance locating current to the conductive part. The conveyance locating current that is flowing through the failed surge arrester is then sensed. In response to the sensing of the conveyance locating current flowing through the failed surge arrester, an RF signal is transmitted that is receivable above ground.

The buried underground conveyance may have a plurality of surge arresters; in that case, the method may further include the step of, in response to the conveyance locating current flowing through the failed surge arrester, activating an external indicator. The external indicator distinguishes the failed surge arrester from other surge arresters of the underground conveyance.

The conveyance locating current may have a locating frequency, in which case the step of sensing the conveyance locating current flowing through the failed surge arrester includes sensing the locating frequency in the failed surge arrester. That locating frequency may be in the range of 85 to 88 Hz. Furthermore, the transmitted RF signal may have substantially the same frequency as the locating frequency.

Another embodiment of the invention is an apparatus for identifying a location of a failed surge arrester in a buried underground conveyance. The conveyance has a conductive part running along its length with a conveyance locating current flowing through the conductive part. The conveyance also has a surge arrester with a filter for conducting current surges to ground while insulating the conveyance locating current from ground. The apparatus includes a conveyance locating current sensor between the filter and ground, and an RF transmitter connected to the conveyance locating current sensor. The sensor activates the transmitter.

The RF transmitter may include an internal antenna. The apparatus may further include an external indicator connected to the conveyance locating current sensor. In that case, the sensor also activates the indicator. The indicator may be a low-voltage light, and may be powered by the conveyance locating current. The transmitter may also be powered by the conveyance locating current.

The filter may be enclosed in a filter housing that also encloses and the transmitter and the sensor.

The conveyance locating current may have a locating frequency, and the conveyance locating current sensor may sense that locating frequency. The transmitter may transmit at the locating frequency. The locating frequency may be in the range of 85 to 88 Hz.

These and other advantages of the invention will be apparent to those of ordinary skill in the art by reference to the following detailed description and the accompanying drawings.

DETAILED DESCRIPTION

Figure 1:
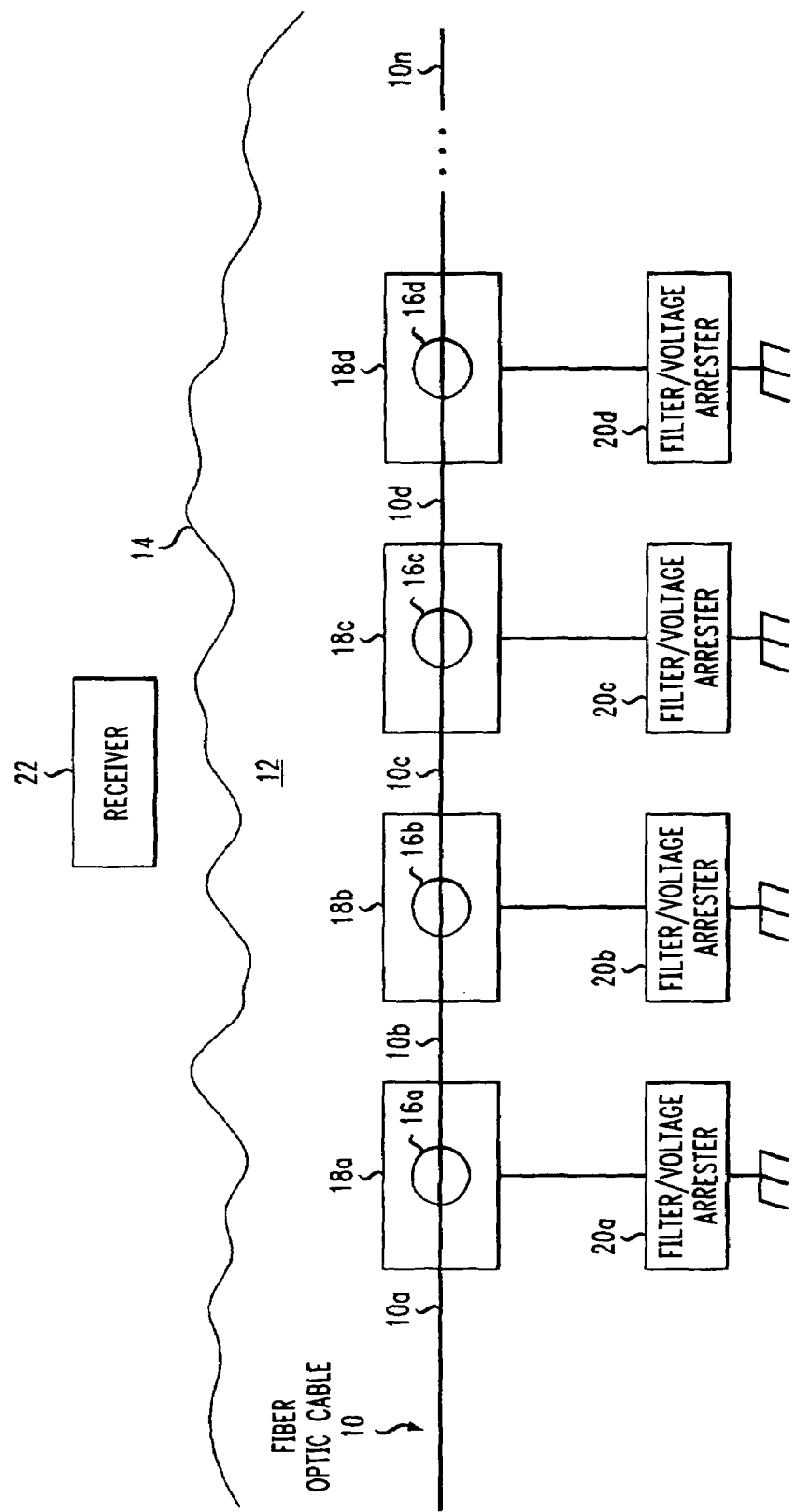
FIG. 1 is a schematic view of an underground fiber optic cable system.

Referring to FIG. 1, a conveyance 10 is buried in the earth 12 a distance of 5 to 10 feet below ground level 14. In the present exemplary embodiment, the conveyance 10 is a fiber optic cable. The fiber optic cable is conventional in its construction and includes one or more individual fibers (not shown) surrounded by a metallic sheath (not shown). In practice, the fiber optic cable 10 actually comprises a plurality of individual cable segments 10a, 10b, 10c, 10d .... Each cable segment 10 is joined to an adjacent cable segment by a corresponding splice 16a, 16b, 16c, 16d .... Surrounding each of the splices 16a, 16b, 16c, 16d ... is a separate corresponding splice case 18a, 18b, 18c, 18d .... Each splice case typically comprises a metallic housing made from aluminum or the like. A filter/arrester 20a, 20b, 20c, 20d ... couples each corresponding one of the splice cases 18a, 18b, 18c, 18d ..., respectively, to circuit ground to provide a path for shunting lightning and other extraneous voltages away from the corresponding splice cases.

During normal operation, each of the filter/arresters 20 effectively shunts lightning and other extraneous voltages to ground without leaking to ground a large amount of a locating signal impressed on the metallic sheath of the fiber-optic cable 10. However, a current surge from a direct or very proximate lightning strike often damages the filter/arrester, causing it to provide a direct path to ground for the locating signal on the fiber optic cable sheath. By shunting the locating signal directly to ground, a damaged or defective filter/arrester prevents detection of the locating signal on the sheath by means of a receiver 22 located above ground level 14 in the manner taught by prior U.S. Pat. No. 5,644,237, the contents of which is hereby incorporated by reference herein. Thus, a defective one of the filter/arresters 20 often causes a cable mis-locate when the receiver 22 cannot detect the locate signal.

In the past, locating a defective filter/arrester required excavating each of the splice cases 18 and testing each of the corresponding filter/arresters 20. Often, most of the filter/arresters tested were not defective, giving rise to unnecessary effort and expense.

Figure 2:
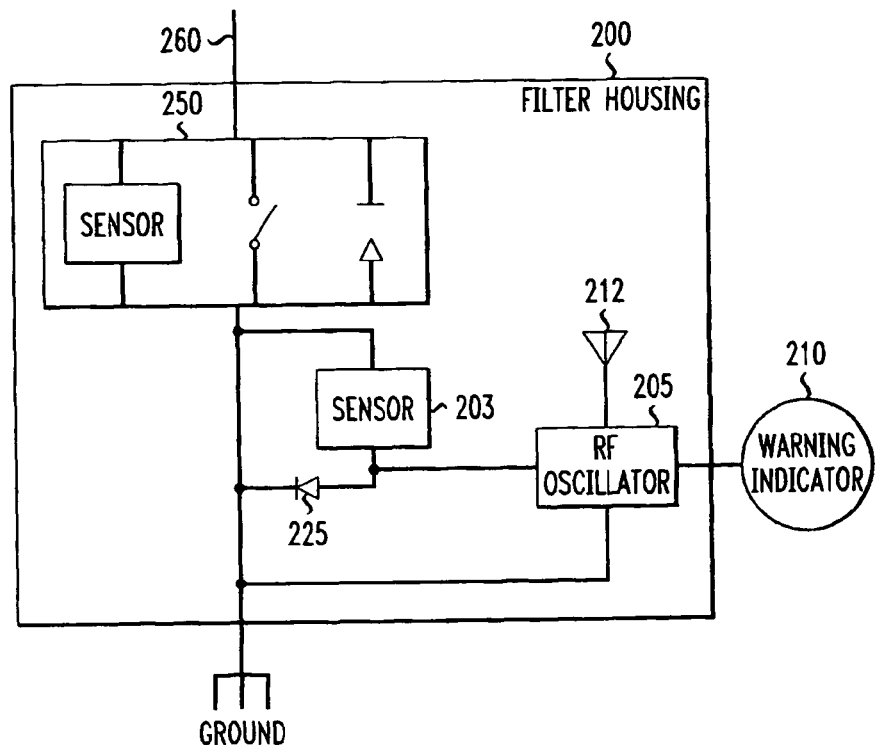
FIG. 2 is a schematic view of a filter/arrester in accordance with the invention.

In accordance with an embodiment of the present invention shown in FIG. 2, a filter/arrester 250 is housed in a filter housing 200. The filter/arrester 250 receives current from circuit 260 connected to the metallic component of the fiber cable (not shown). As is known in the art, the filter/arrester 250 includes a 60 Hz filter trap for grounding induced 60 Hz induced current. In parallel with the filter trap is a gas tube and metal oxide varistor for conducting high voltage, such as from a lightning strike or the like, to ground. While permitting induced 60 Hz current and high voltage spikes to flow to ground, the filter/arrester 250, when functioning properly, substantially prevents the cable locating signal from traveling to ground.

Also installed within the housing 200 is a sensor 203 for monitoring the cable-locating signal that is on the cable 260 but is normally blocked to ground by the filter/arrester 250. The sensor 203 is preferably a filter tuned to the cable locating frequency, typically in the range of 85 to 88 Hz. If the filter/arrester 250 fails, then current of all frequencies, including the locator signal, travels to ground. When that occurs, the sensor 203 detects current flowing to ground at the locating frequency and turns on a small radio frequency oscillator 205 also tuned to 85 to 88 Hz. The oscillator 205 emits an RF signal that a technician can receive above ground with a cable-locating device, as is known in the art. An internal antenna 212 may be included within the housing 200 for transmission of the RF signal.

A warning indicator 210 is installed on the outside of the filter housing 200. The indicator is turned on by the sensor 203 when the RF oscillator 205 is activated; i.e., when current is flowing through the filter arrester to ground at the locating frequency. The external warning indicator 210 identifies a particular filter housing as containing a defective filter. That information is particularly helpful to a technician in cases where there are multiple filters installed at a single location.

In a preferred embodiment, the RF transmitter 203 and the indicator light 210 are powered using the locating current passing through the cable. Alternatively, those components may be powered by battery or by another power source.

In accordance with the invention, an above-ground cable locating receiver 22 (FIG. 1) is equipped to receive an RF frequency in the 85 to 88 Hz band. To use the receiver, a technician operates it in the area of the suspected fault. The technician sets the unit to receive the known frequency of the RF oscillator (85 to 88 Hz). If the transmitter 205 is operating (fault present), a message indicating trouble will be received in the cable locating receiver and viewed on the technician's cable locator display screen. Once a fault is found, the location can be excavated and the filter can be removed and replaced. The warning indicator will verify the correct filter to be changed in situations where multiple filters are installed at a single location.

Figure 3:
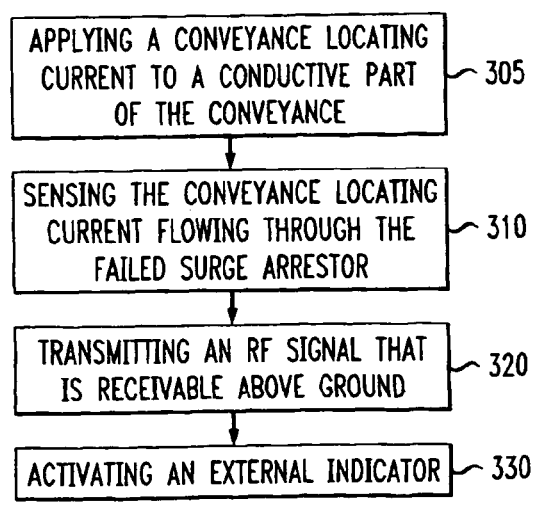
FIG. 3 shows block diagram representing a method according to the invention.

A method for identifying a location of a failed surge arrester in a buried underground conveyance according to the invention is shown in FIG. 3. A conveyance locating current is first applied to a conductive part of the conveyance running along its length (step 305). Filter/arresters in the conveyance that are functioning normally will not permit the conveyance locating current to flow to ground. A failed filter/arrester, however, permits such flow. That flow is sensed (step 310). In response to sensing the conveyance locating current flowing through the failed surge arrester, an RF signal receivable above ground is transmitted (step 320) from the filter housing. Additionally, an external indicator such as a light may be actuated (step 330) in response to sensing the current flow through the failed surge arrester.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. An apparatus for identifying a location of a failed surge arrester in a buried underground conveyance having a conductive part running along its length with a conveyance locating current flowing through the conductive part, and having a surge arrester with a filter for conducting current surges to ground while insulating the conveyance locating current from ground, and the apparatus comprising:

a conveyance locating current sensor for monitoring the conveyance locating current; and an RF transmitter responsive to the conveyance locating current sensor, the transmitter being activated by the sensor and generating an RF signal that can be sensed above ground when the conveyance locating current travels to ground.

2. The apparatus of claim 1, wherein the RF transmitter further comprises an internal antenna.

3. The apparatus of claim 1, further comprising an external indicator connected to the conveyance locating current sensor, whereby the sensor activates the indicator.

4. The apparatus of claim 3, wherein the indicator is a low-voltage light.

5. The apparatus of claim 3, wherein the indicator is powered by the conveyance locating current.

6. The apparatus of claim 1, wherein the transmitter is powered by the conveyance locating current.

7. The apparatus of claim 1, wherein the filter is enclosed in a filter housing, and the filter housing also encloses and the transmitter and the sensor.

8. The apparatus of claim 1, wherein the conveyance locating current has a locating frequency, and the conveyance locating current sensor senses the locating frequency.

9. The apparatus of claim 8, wherein the transmitter transmits at the locating frequency.

10. The apparatus of claim 8, wherein the locating frequency is in the range of 85 to 88 Hz.

* * * * *